United States Patent [19]
Judy et al.

[11] Patent Number: 5,945,898
[45] Date of Patent: *Aug. 31, 1999

[54] MAGNETIC MICROACTUATOR

[75] Inventors: Jack W. Judy, Berkeley; Richard S. Muller, Kensington, both of Calif.

[73] Assignee: The Regents of the University of California, Oakland, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/657,815

[22] Filed: May 31, 1996

[51] Int. Cl.$^6$ ................................................. H01H 51/22
[52] U.S. Cl. ............................................. 335/78; 257/415
[58] Field of Search ................................ 335/78–86, 124, 335/128; 257/415, 422, 686, 689

[56] References Cited

U.S. PATENT DOCUMENTS

| | | | |
|---|---|---|---|
| 5,398,011 | 3/1995 | Kimura et al. | 335/79 |
| 5,411,769 | 5/1995 | Hornbeck . | |
| 5,424,866 | 6/1995 | Kikinis . | |
| 5,469,302 | 11/1995 | Lim . | |
| 5,505,807 | 4/1996 | Min et al. . | |
| 5,506,720 | 4/1996 | Yoon . | |
| 5,552,923 | 9/1996 | Min . | |
| 5,557,132 | 9/1996 | Takahashi | 257/415 |
| 5,585,956 | 12/1996 | Lee et al. . | |
| 5,606,452 | 2/1997 | Min . | |
| 5,610,757 | 3/1997 | Ji et al. . | |
| 5,629,918 | 5/1997 | Ho et al. . | |
| 5,655,665 | 8/1997 | Allen et al. . | |
| 5,724,015 | 3/1998 | Tai et al. | 335/78 |

OTHER PUBLICATIONS

Chang et al., "A Fully Integrated Surface Micromachined Magnetic Microactuator with a Multimedia Meander Magnetic Core," *Journal of Micromechanical Systems*, V.2, No. 1, Mar. 1993.

Akiyama, Terunobu et al., "A New Step Motion of Polysilicon Microstructures", *Proceedings IEEE* (Feb., 1993) 272–277.

Buhler, et al., "Double Pass Metallization for CMOS Aluminum Actuators", *Transducers '95–Eurosensors IX* (Jun., 1995) 360–363.

Chung, Seok–Whan, et al., "Design and Fabrication of Micro Mirror Supported by Electroplated Nickel Posts", *Transducers '95–Eurosensors IX* (Jun., 1995) 312–315.

Goosen, J.F.L. et al, "Object Positioning Using a Surface Micromachined Distributed System", *Transducers '95–Eurosensors IX* (Jun., 1995) 396–399.

Liu, Chang, et al., "Out–of–Plane Permalloy Magnetic Actuators for Delta–Wing Control", *Proceedings IEEE* (Jan. & Feb. 1995) 7–12.

Shikida, Mitsuhiro, et al., "Fabrication of an Electrostatic Microactuator with an S–Shaped Film", *Transducers '95–Eurosensors IX* (Jun. 1995) 426–429.

(List continued on next page.)

*Primary Examiner*—Lincoln Donovan
*Attorney, Agent, or Firm*—Fish & Richardson P.C.

[57] ABSTRACT

A selectively actuatable microstructure is provided having a base, a cantilevered element supported by at least one mechanical attachment attached to the base which permits the element to change its orientation, and at least one layer of magnetically-active material placed on one or more regions of a surface of the cantilevered element. A selectively applied magnetic field can apply torque to the cantilevered element and cause it to move. A voltage source causes a Coulombic attractive force for holding the cantilevered element against movement in the presence of an applied magnetic field. A number of the selectively actuatable microstructures may be provided in an array so that each of the microstructures may be individually actuated by the selective switching of the corresponding voltage sources.

31 Claims, 8 Drawing Sheets

OTHER PUBLICATIONS

T. Akiyama, et al., "A New Step Motion of Polysilicon Microstructures", *IEEE, Micro Electro Mechanical Systems*, An investigation of Micro Structures, Sensors, Actuators, Machines and Systems, Feb. 7–10, 1993, Cat. No. 93CH3265–6, pp. 272–277.

Chang Liu, et al., "Out–of–Plane Permalloy Magnetic Actuators for Delta–Wing Control", IEEE, *Micro Electro Mechanical Systems*, Jan. 29, Feb. 2, 1995, Cat. No. 95CH35754, pp. 7–12.

Seok–Whan Chung, et al., "Design and Fabrication of Micro Mirror Supported by Electroplated Nickel Posts", The 8th Int. Conference on Solid–State Sensors and Actuators and Eurosensors IX, *Digest of Technical Papers*, Jun. 25–29, 1995, Stockholm Sweden, vol. 1, pp. 312–315.

M. Shikida, et al., "Fabrication of an Electrostatic Micro-actuator with an S–Shaped Film", The 8th Int. Conference on Solid–State Sensors and Actuators and Eurosensors IX, *Digest of Technical Papers*, Jun. 25–29, 1995, Stockholm Sweden, vol. 1, pp. 426–429.

J. Buhler, et al., "Double Pass Metallization for CMOS Aluminum Actuators", The 8th Int. Conference on Solid–State Sensors and Actuators and Eurosensors IX, *Digest of Technical Papers*, Jun. 25–29, 1995, Stockholm Sweden, vol. 1, pp. 360–363.

J. Goosen, et al., "Object Positioning Using a Surface Micromachined Distributed System", The 8th Int. Conference on Solid–State Sensors and Actuators and Eurosensors IX, *Digest of Technical Papers*, Jun. 25–29, 1995 Stockholm Sweden, vol. 1, pp. 396–399.

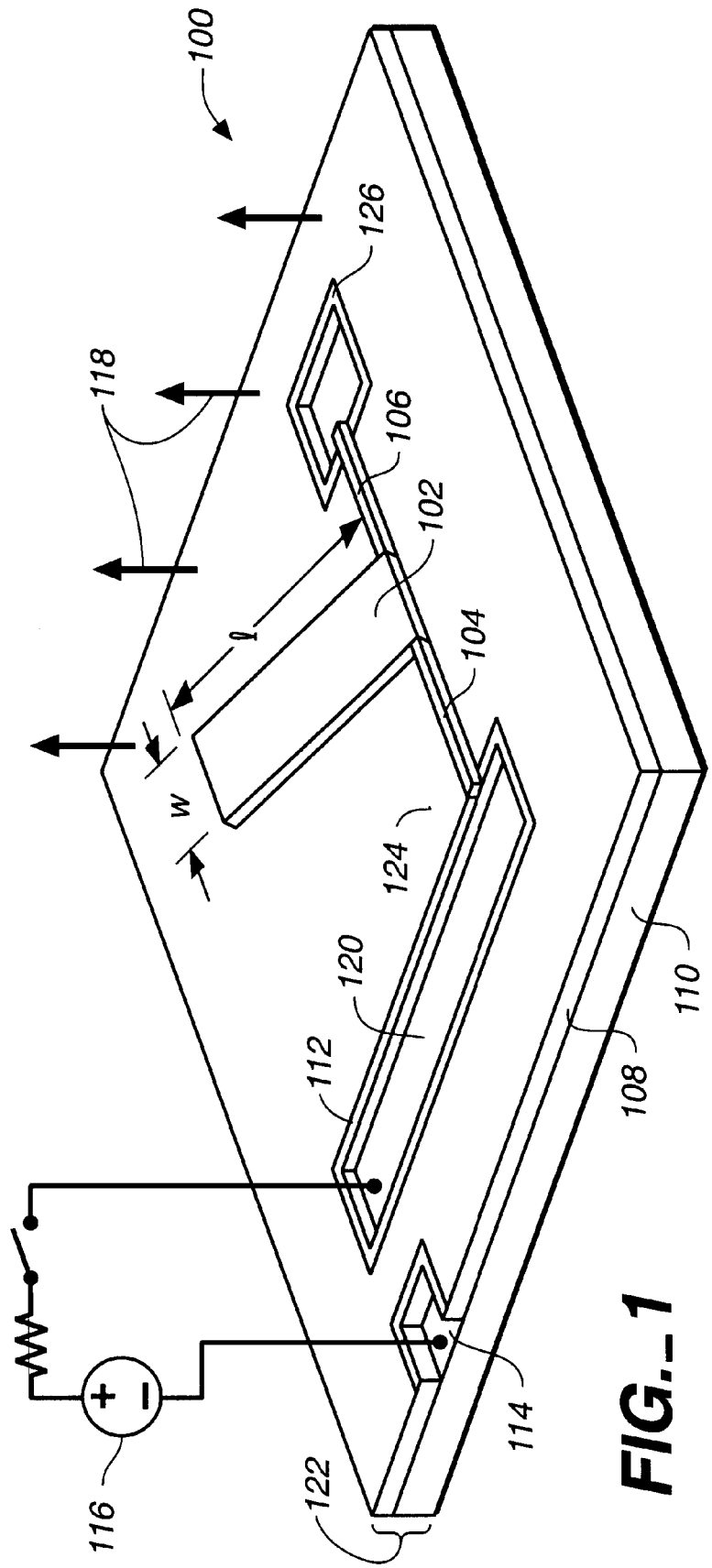
FIG._1

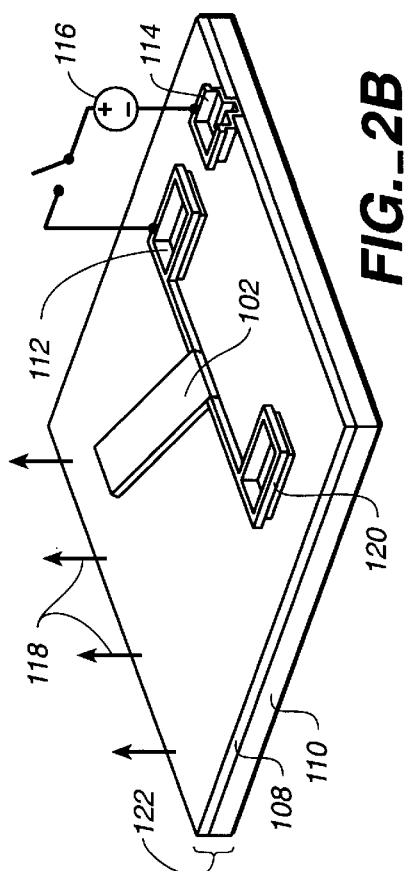
FIG._2B
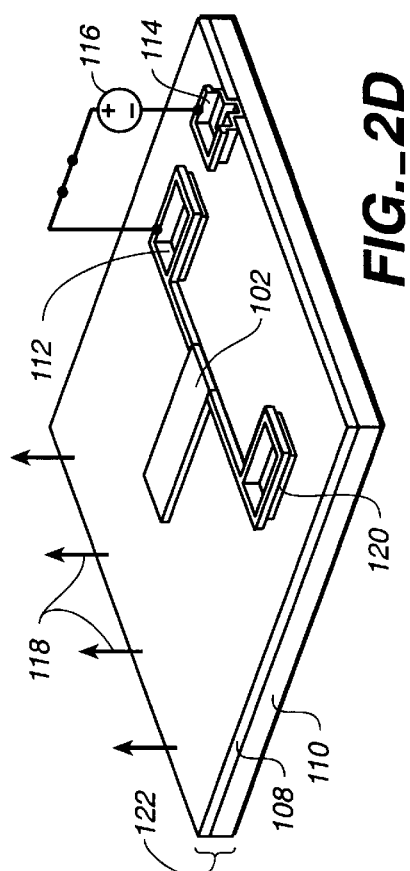
FIG._2D
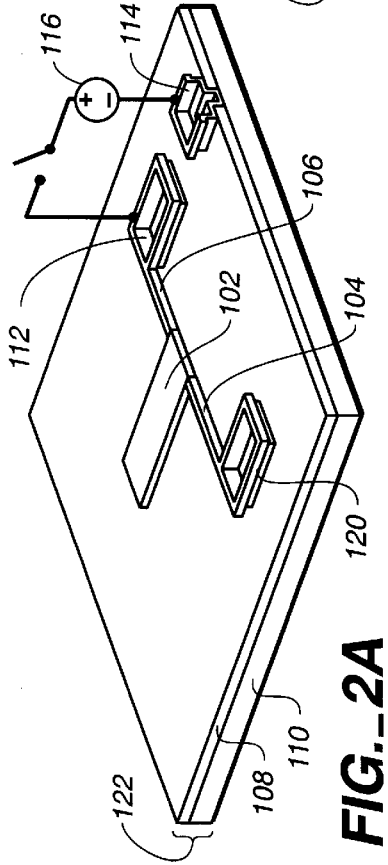
FIG._2A
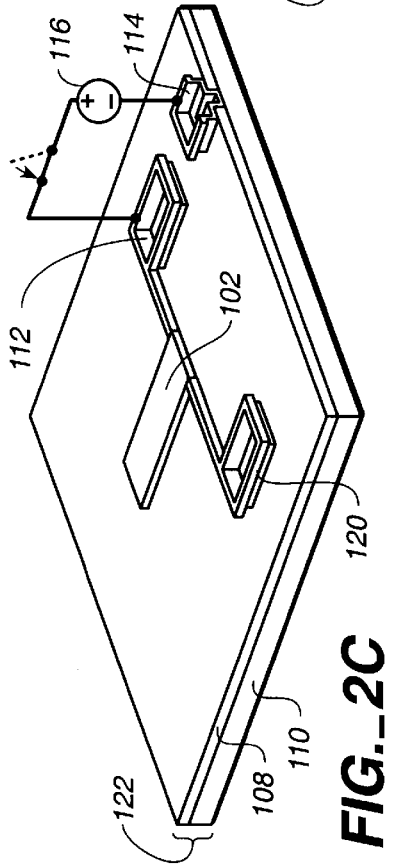
FIG._2C

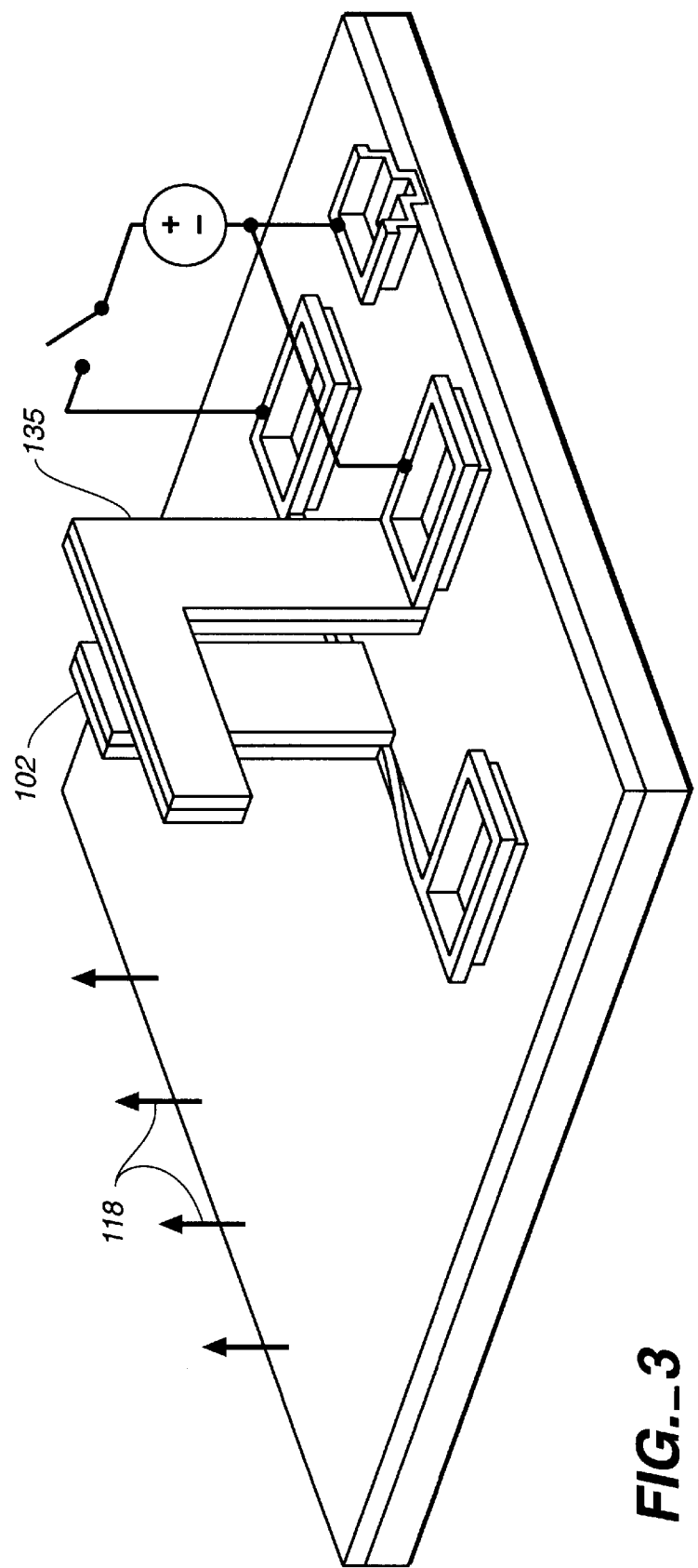
FIG._3

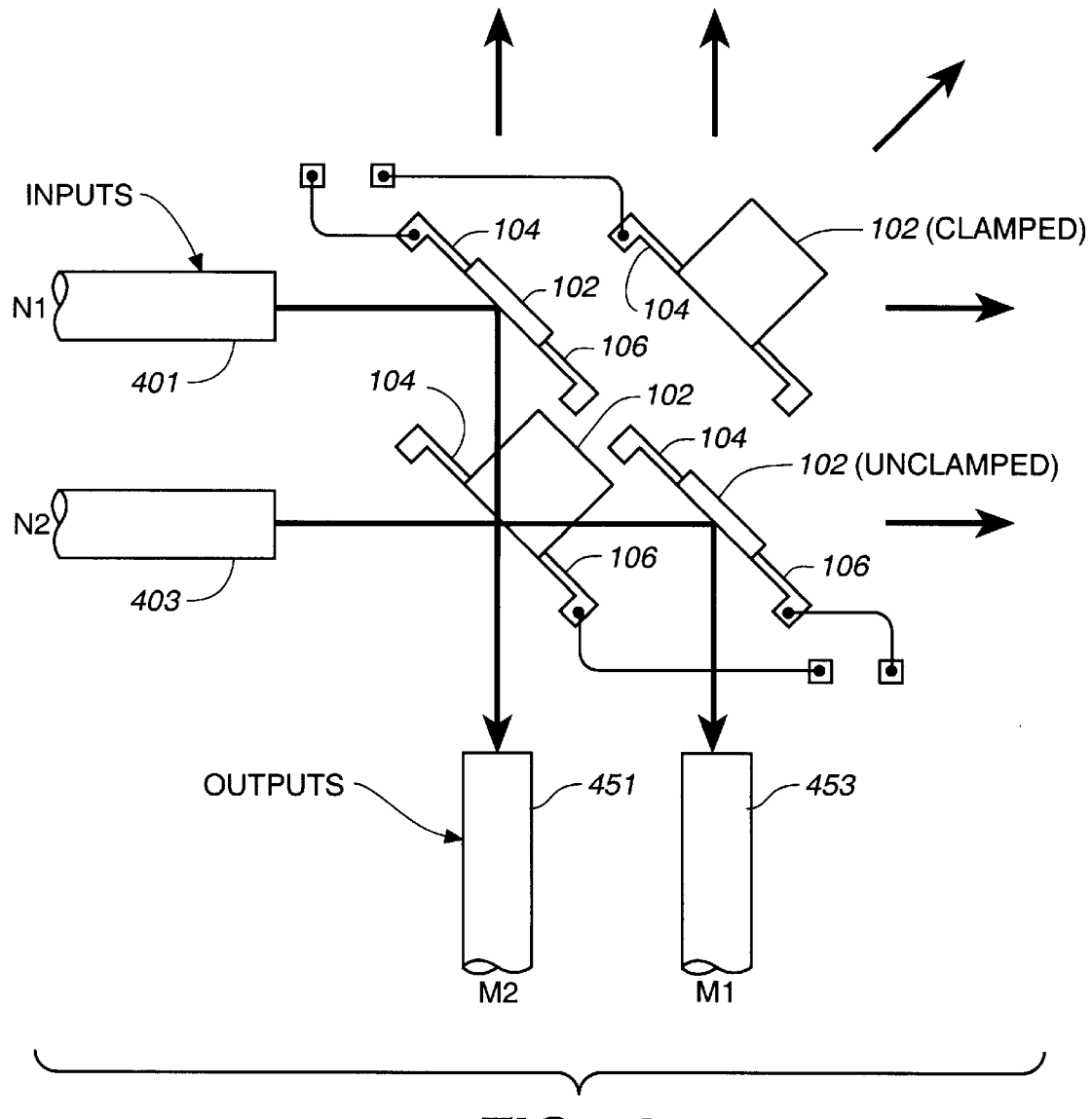
FIG._4

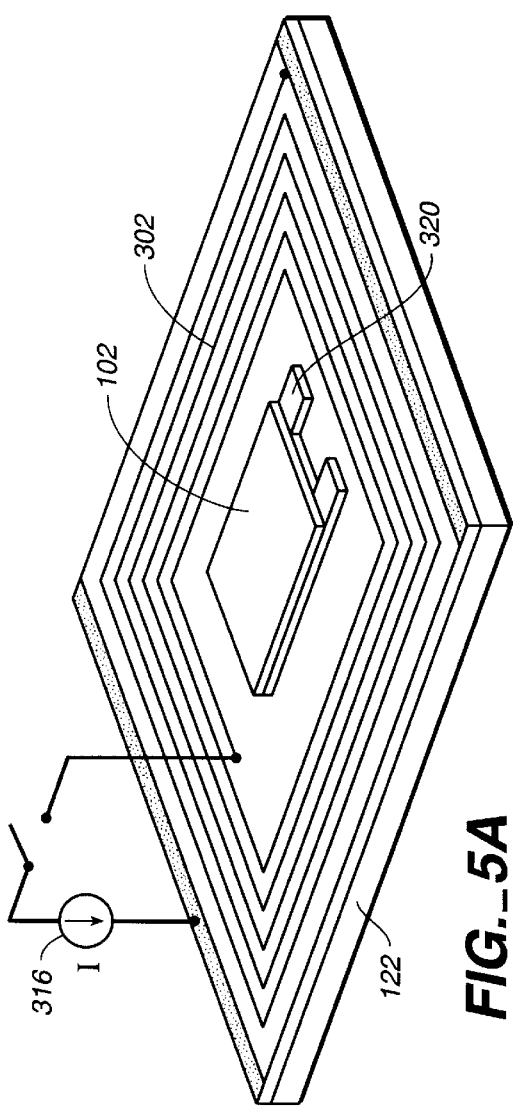
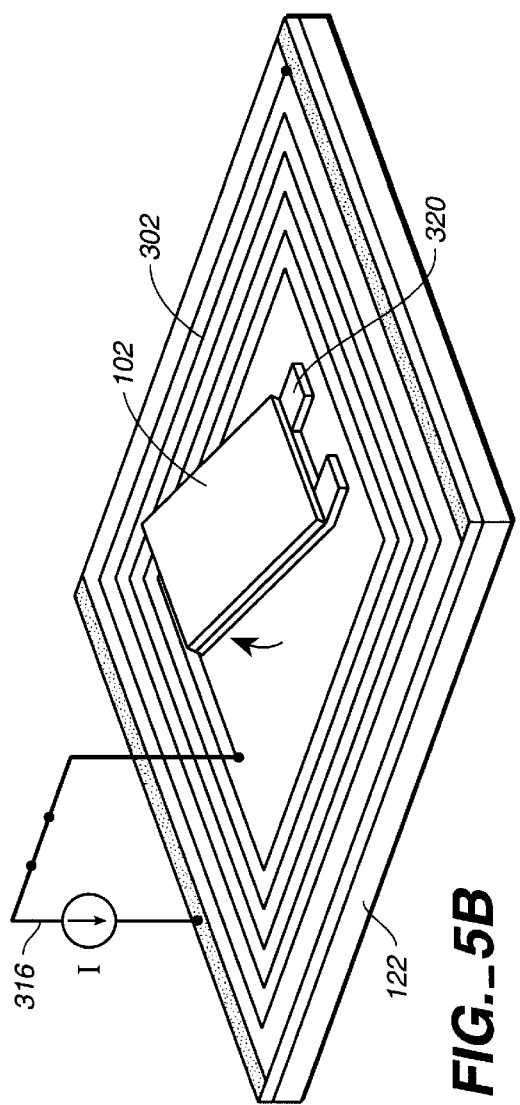
FIG._5A
FIG._5B

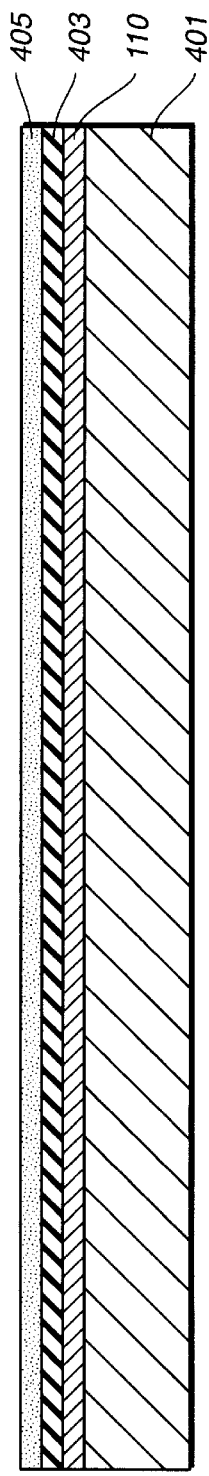
FIG.__6A
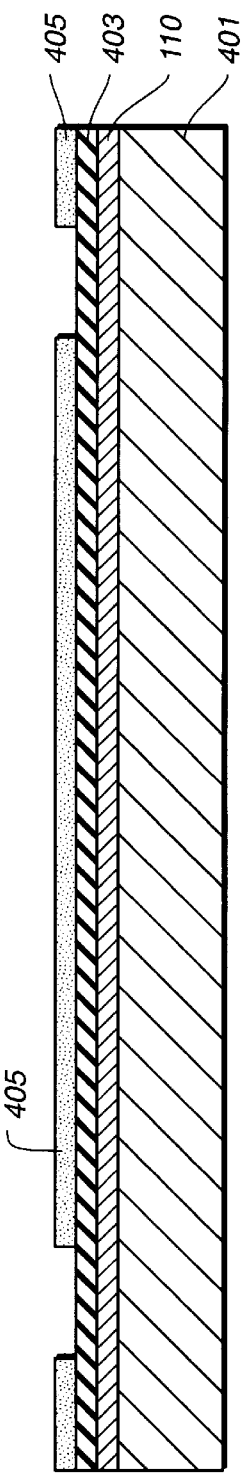
FIG.__6B
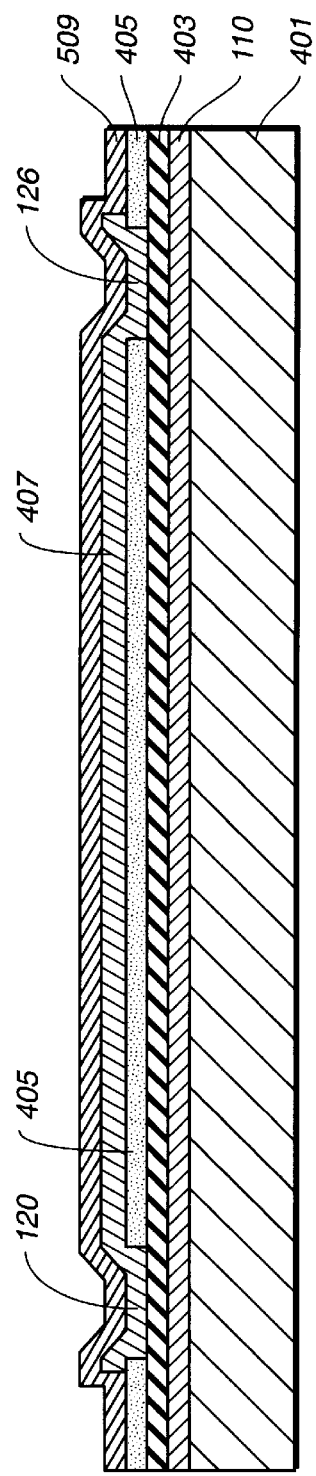
FIG.__7A

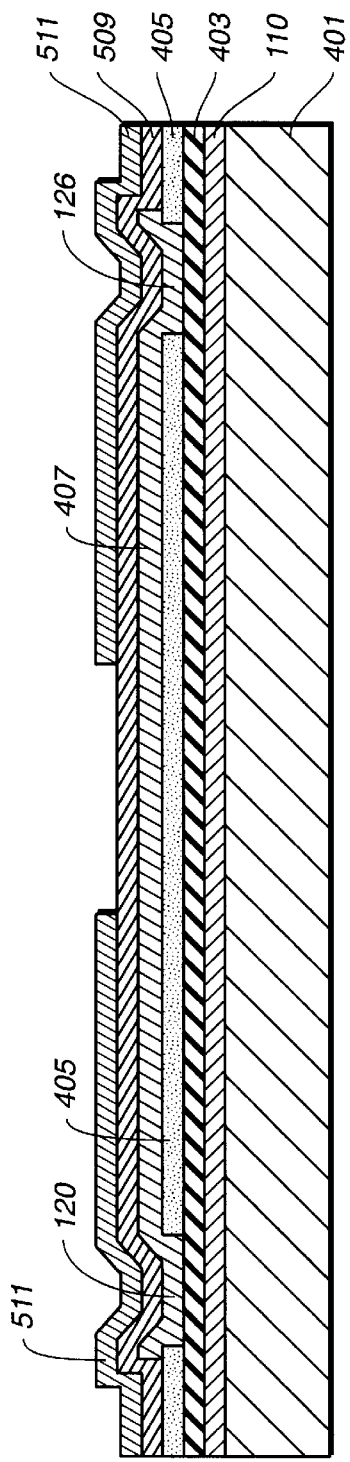
FIG._7B
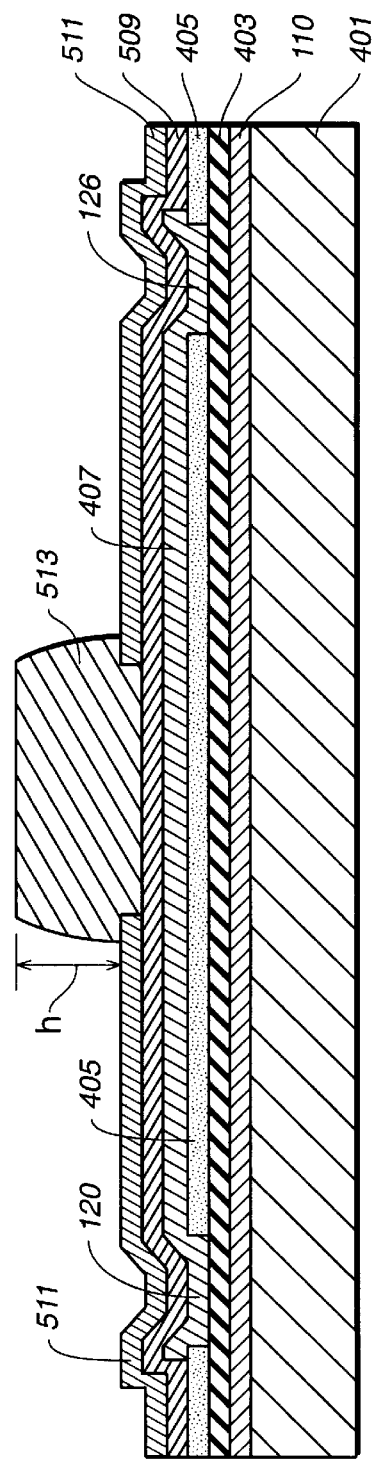
FIG._7C

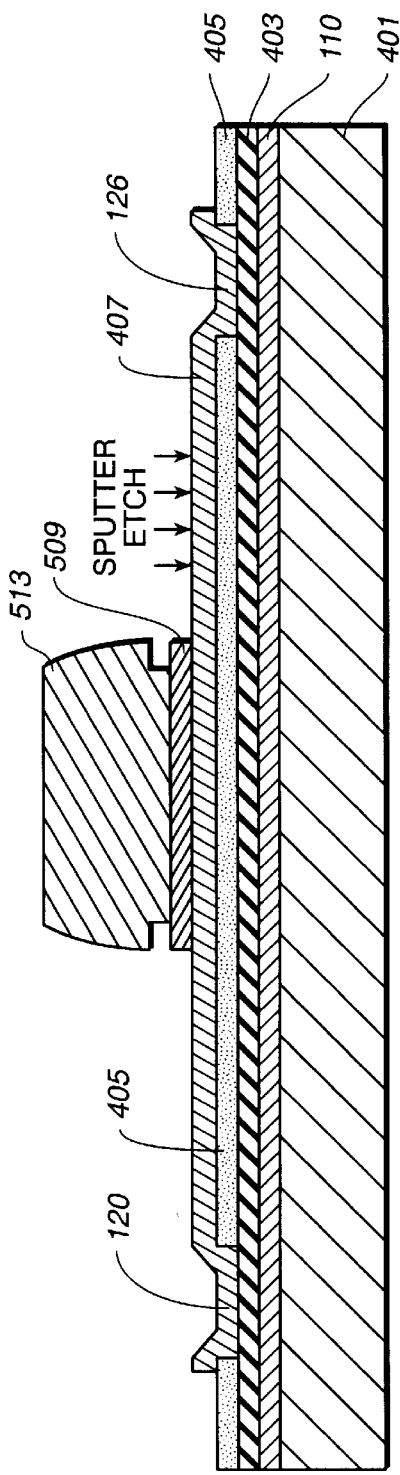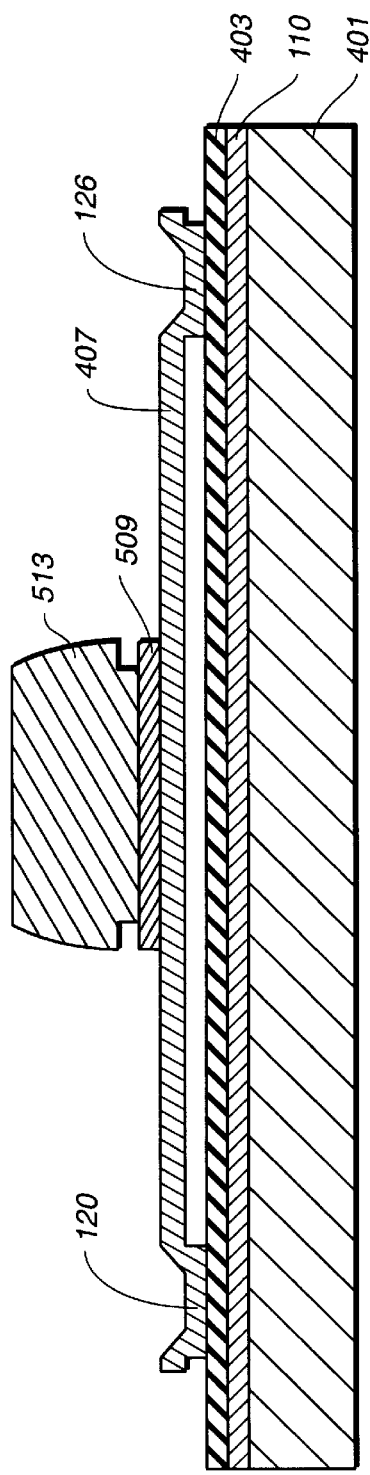

MAGNETIC MICROACTUATOR

BACKGROUND

The present invention relates generally to micromachined structures, and more particularly to three-dimensional, thin-film, micromachined magnetic microactuators that may be selectively addressed.

Microelectromechanical systems often integrate micromechanical and microelectronic devices on the same silicon chip. These systems have many useful applications such as microsensors and microactuators. The accelerometer chips used to trigger air bag inflation in automobiles in the event of a collision are an example of a microsensor. Microvalves used to control fluidic circuits are examples of microactuators.

Microstructures can be made by photolithography and etching of deposited thin films to yield desired shapes. This is called "surface micromachining" because the thin films are deposited on a surface. The films are typically formed through the process of low-pressure chemical vapor deposition (LPCVD).

Integrated circuit and magnetic recording-head fabrication technologies can be used to machine microelectrical and micromechanical devices. These devices have mechanical and electrical components that typically require actuation to perform their intended functions. Such actuation can be accomplished by several methods including electrostatic and magnetic forces.

Components which create electrostatic forces are relatively easy to manufacture. These forces are large if operated with small gaps between electrodes, but small otherwise. They can be integrated with and controlled by integrated circuits.

The electrostatic forces typically used in micromachines are attractive rather than repulsive. Attractive forces may be disadvantageous when it is desired to move a structure away from a surface because an electrode that overhangs the surface may be required in such a case.

Magnetic forces are advantageous for certain microstructure designs. They have the characteristic of often being very large, especially those created using ferromagnetic materials. In addition, magnetic forces can be created by external sources, resulting in a substantial saving of space.

There are some disadvantages to using magnetic forces. Components which create magnetic forces are often difficult to manufacture. Also, manual assembly is usually required rather than a continuous batch process.

An object of the invention is to combine the features of electrostatic forces and magnetic forces within the same microstructure.

A further object is the design of a magnetic microactuator that may be batch-processed.

SUMMARY OF THE INVENTION

A selectively actuatable microstructure is provided having a base, a cantilevered element supported by at least one mechanical attachment attached to the base which permits the element to change its orientation, and at least one layer of magnetically-active material placed on one or more regions of a surface of the cantilevered element. The cantilevered element, the mechanical attachment, and the magnetically-active material are microfabricated in one batch process such that a selectively applied magnetic field can apply torque to the cantilevered element and cause it to move.

A first electrical connnection may be made to the cantilevered element, and a second electrical connnection may be made to the base region. A voltage source may be electrically connected between the first and second electrical connections to cause a Coulombic attractive force for holding the cantilevered element against movement in the presence of an applied magnetic field.

A number of the above selectively actuatable microstructures may be provided in an array so that each of the microstructures may be individually actuated by the selective switching of the corresponding voltage sources.

A selectively actuatable microstructure may also be made with a conducting pattern placed on the base region surrounding the cantilevered element such that a current can be passed through the conducting pattern to cause a magnetic field that is localized in the region of the cantilever for causing the cantilever to move.

This type of selectively actuatable microstructure may also be made in an array where only the selectively actuatable microstructures that have current passed through their corresponding conducting patterns are actuated. The conducting pattern for each may be, for example, magnetic coils.

The mechanical attachment may be at least one torsional support, a flexing material such as polyimide, or a hinged linkage.

The cantilevered element is highly reflective to direct optical beams for displays or communications.

The cantilevered element may be a strongly dispersive element in an acoustic beam such that the cantilevered element is easily detectable in an acoustic field such as a medical ultrasound system. The cantilevered element may also serve as a platform for an energy source device such as an ultrasound emitter, an electromagnetic radiation emitter, or an energy sensor.

An advantage of the invention is that high-quality arrays of microactuated structures can be batch-processed. Another advantage is the absence of interactions between adjacent structures and a very high areal density of structures that can be achieved. The invention can be advantageously used in optical scanners, displays, switches, gratings, microflow systems, sensors, micromirror systems, and in microphotonic applications such as beam chopping and steering.

Additional advantages of the invention will be set forth in the description that follows, and in part will be obvious from the description, or may be learned by practice of the invention. The advantages of the invention may be realized and obtained by means of the instrumentalities and combinations particularly pointed out in the claims.

BRIEF DESCRIPTION OF THE DRAWINGS

The accompanying drawings, which are incorporated in and constitute a part of the specification, schematically illustrate the invention and, together with the general description given above and the detailed description given below, serve to explain the principles of the invention.

FIG. 1 is a schematic view of a magnetic microactuator according to a first embodiment of the invention.

FIGS. 2(a)–(d) are schematic views of the magnetic microactuator of FIG. 1, under the influence of various combinations of a magnetic force and an electrostatic clamping force.

FIG. 3 is a schematic plan view of a magnetic microactuator according to an embodiment of the invention having a restraining stop.

FIG. 4 is a schematic diagram of the implementation of an N×M system of magnetic microactuators used as an optical switch.

FIG. 5(a) is a schematic plan view of a magnetic microactuator according to a second embodiment of the invention, in the unselected or non-actuated condition.

FIG. 5(b) is a schematic plan view of a magnetic microactuator according to a second embodiment of the invention, in the selected or actuated condition.

FIG. 6 is a diagram illustrating a partial number of steps of a microfabrication technique for manufacturing a magnetic microactuator, these steps showing the process up to the step of etching holes where anchors will be placed.

FIG. 7 is a diagram illustrating a partial number of steps of a microfabrication technique for manufacturing a magnetic microactuator, these steps showing the process of constructing a magnetic plate.

DESCRIPTION OF THE PREFERRED EMBODIMENTS

The following patents describe various types of microelectromechanical structures as well as fabrication techniques for their manufacture: U.S. Pat. No. 4,674,319 entitled "Integrated Circuit Sensor"; U.S. Pat. No. 4,740,410 entitled "Micromechanical Elements and Methods for Their Fabrication"; and U.S. Pat. No. 5,252,881 entitled "IC-Processed Micromotors and Methods for their Fabrication". These patents are assigned to the assignee of the subject application and are hereby incorporated by reference in their entirety.

Referring now to FIG. 1, a magnetic microactuator 100 is shown having a magnetic plate 102 fabricated on a base 122. Magnetic plate 102 is generally a cantilevered element attached to base 122 by a mechanical attachment which permits the element to change its orientation.

Base 122 is fabricated by a deposition process such as those used in optical-resist technology. Base 122 is usually composed of an insulating layer 108 on top of a lower electrode layer 110. A hole is made through insulating layer 108 to allow a lower contact 114 to electrically connect lower electrode layer 110 with a clamping voltage supplied by a voltage source 116. An upper contact 112 is formed on top of insulating layer 108 to electrically connect the clamping voltage with the clamping system described below.

Magnetic plate 102 may be a rectangular beam, and it may constitute a single layer of magnetically-active material. Alternatively, magnetic plate 102 may have a layer of magnetically-active material plated onto a nonmagnetic material. More than one region of the magnetic plate may be so plated. The magnetic material can be one of various combinations of nickel, iron or other elements, and is usually ferromagnetic with a high saturation magnetization. Magnetic plate 102 is commonly about 430×130×15 cubic micrometers (length×width×height), although plates with their largest dimensions ranging roughly from 10 micrometers to more than a millimeter can be built.

Magnetic plate 102 is mounted to base 122 by mechanical attachments such as torsion beams 104 and 106 in a torsion-beam suspension system. In an alternative embodiment, only one beam may be used. Moreover, rather than a torsion-beam suspension, hinged linkages or folding mountings may be used. Flexible materials such as polyimide may also be used as a mechanical attachment.

Mechanical movement in this embodiment is performed by magnetic plate 102 rotating about torsion beams 104 and 106. The torsion beams 104 and 106 constrain the rotation of the magnetic film 102 to a single axis. Torsion beams 104 and 106 are secured against rotation by anchors 120 and 126. They are generally conductive and can be phosphorus-doped LPCVD polysilicon. They may be about 400×2.2×2.2 cubic micrometers (length×width×height). Beams may be used with length dimensions from about 10 micrometers to about a millimeter and cross-sectional dimensions from approximately 1.0 micrometer by 0.1 micrometers to 100.0 micrometers by 10.0 micrometers.

When a magnetic field 118 is applied, the resulting torque rotates magnetic plate 102 about torsion beams 104 and 106. Rotations of more than 90° can be achieved. Magnetic field 118 may often be, for example, several kiloamperes per meter. The torque caused by magnetic field 118 can be greater than 3.0 nanonewton-meters and is generally in the range of about 1 nanonewton-meter to about 100 nanonewton-meters.

The torque strains torsion beams 104 and 106. The final position of magnetic plate 102 is established when there is equilibrium between the restoring torque from strained torsion beams 104 and 106 and the torque on the system caused by magnetic field 118 on magnetic plate 102.

An electrostatic clamping system is implemented on base 122 to restrain magnetic plate 102 from rotation. The clamping system includes clamping voltage source 116, upper contact 112 for forming a first connection between magnetic plate 102 and voltage source 116, lower electrode layer 110, lower contact 114 for forming a second connection between base 122 and voltage source 116, and insulating layer 108. In use, an electrostatic clamping field applies a Coulombic force by placing clamping voltage source 116 across upper contact 112 and lower contact 114. A circuit is formed from lower electrode layer 110, clamping voltage source 116, upper contact 112, torsion beams 104 and 106, and magnetic plate 102. Magnetic plate 102, acting as an upper electrode, rotates back onto clamping area 124 to form one plate of a capacitor that couples to lower electrode layer 110.

The field created by clamping voltage source 116 is generally constant over clamping area 124. It is not necessary to concentrate the field, as the field will usually be strongest in the clamping area due to the close proximity of the magnetic plate to the lower electrode. Fringing fields may occur around the clamped plate, but these usually are not strong and do not affect the operation of the microactuator. The clamping voltage source 116 is switchable and can be as low as 5 volts or even lower. The clamping voltage source 116 may be generated by external sources such as power supplies or batteries, or by internal sources on the chip.

FIGS. 2(a)–(d) show the magnetic microactuator at positions according to the presence of an applied magnetic field 118 and the status of a clamping voltage 116. FIG. 2(b) is similar to FIG. 1. Magnetic field 118 acts to rotate magnetic plate 102 so that its equilibrium position is out of the plane of base 122. FIG. 2(a) shows the situation when magnetic field 118 is removed. Magnetic plate 102 rests on base 122 because torsion beams 104 and 106 hold the plate against rotation in the absence of magnetic field 118.

FIGS. 2(c) and (d) illustrate the effect of clamping voltage source 116. When such a clamping voltage is activated, magnetic plate 102 is clamped to base 122 by electrostatic attraction. This can occur whether or not a magnetic field 118 is applied (FIGS. 2(c) or (d)).

The user may choose materials, clamping voltage sources, and applied-magnetic fields to adjust the sensitivity of the microactuator for any particular purpose or application.

Referring to FIG. 3, if a simple binary on/off operation is desired, the system may be fabricated so that magnetic plate 102 is stable at only one of two positions. In this case, magnetic field 118 is designed to be strong enough to rotate magnetic plate 102 to a mechanical restraining stop 135, restraining magnetic plate 102 against further rotation.

It should be noted that magnetic plate 102 need not be a rectangular beam. Other structures having magnetic portions can be used which can move by, for example, sliding or rolling.

A large array of such microstructures may be fabricated on a chip, and each can be selectively actuated by, for example, an electrostatic address arrangement.

An application of such an array is an optical switch. In this case, each magnetic plate 102 may act as a mirror; a suitable mirror coating may be deposited on each to enhance reflectivity if desired. Referring to FIG. 4, an N-by-M array of individually-controlled microstructures is diagrammed. For clarity, only two optical inputs 401 and 403, and two optical outputs 451 and 453 are shown. The inputs and outputs are usually collimated. The N inputs (401, 403, . . . ) are along one side of the array and the M outputs (451, 453, . . . ) are along an adjacent side. The switching elements are the array of microstructures 102. In each element of the array, magnetic plate 102 is oriented at 45° to an incoming optical beam.

If the mth element along one of the N input beams is actuated, that beam is reflected into the mth of the M outputs. All but one mirror in a given input line is held down by the clamping electrostatic voltages on the elements. The actuated mirror selects the output for that line.

Another application may be an optical display. A large array of structures are addressed individually forming the reflected image. The display rate is related to the rate at which the structures can be addressed. At atmospheric pressure, the structures may be addressable at rates on the order of a kilohertz. For operation with video systems having higher rate requirements, the structures may be encapsulated in a vacuum enclosure.

A further application is an optical scanner. In this application, light incident on the magnetic plates 102 can be reflected at an angle controlled by the deflection.

Yet a further application is a sensitive probe of magnetic fields. In this application, varying magnetic fields on the surface can provoke a varying response in the array.

In a further application, an array of magnetic plates may be made highly reflective to direct optical beams for displays or communications.

In another application, an array of cantilevered elements may be a strongly dispersive element in an acoustic beam such that the cantilevered element is easily detectable in an acoustic field such as a medical ultrasound system. An array of cantilevered elements may also serve as a platform for an energy source device such as an ultrasound emitter, an electromagnetic radiation emitter, or an energy sensor.

Referring to FIGS. 5a and 5b, a second embodiment includes a magnetic plate 102 which is actuated by a conducting pattern such as an encircling coil 302. In this embodiment, coil 302, which is generally planar and driven by a current source 316, generates a field sufficient to rotate magnetic plate 102 out of the plane of base 122. As in the embodiment above, magnetic plate 122 may be attached to base 122 by mechanical attachments 320.

FIG. 6 illustrates a fabrication technique which may be used to construct the magnetic microactuator. Generally, the cantilevered element such as magnetic plate 102, the mechanical attachments such as torsion beam 104 and 106, and the plating of a magnetically-active material are fabricated in a single batch process.

As shown in FIG. 6(a), a substrate such as a silicon wafer 401 is loaded into a deposition chamber (not shown). The lower electrode 110 may be formed first either by heavily doping the surface of the silicon wafer or by depositing a conductive layer of a material such as doped polycrystalline silicon. An insulating dielectric layer 403 such as silicon nitride is then deposited. A sacrificial layer 405 is deposited on top of the dielectric layer 403. Sacrificial layer 405 is, for example, silicon dioxide doped with phosphorus.

As shown in FIG. 6(b), holes are etched through sacrificial layer 405 to insulating layer 403, creating positions for anchors 120. Holes are also etched (not shown) through both sacrificial layer 405 and insulating layer 403 to provide lower electrical contact 114.

Referring to FIG. 7(a), a conductive layer 407 is then deposited above the sacrificial layer 405. Conductive layer 407 serves as the mechanical material from which the magnetic plate, torsion beams, and anchor are eventually constructed. This conductive material may be, for example, phosphorus-doped polycrystalline silicon or a heavily-doped silicon substrate. This material is deposited through the holes in sacrificial layer 405 to form anchors 120 and 126 (shown in FIG. 7(a)). This conductive layer may undergo additional processing such as annealing to improve its mechanical properties. After processing, conductive layer 407 is etched to form the mechanical structure.

Before the mechanical structure can be used as magnetic plate 102, a magnetic layer must be deposited. An electroplating seed layer 509 is deposited first on the mechanical structure to prepare it for electroplating. Electroplating seed layer 509 may be, for example, nickel, an alloy of iron-nickel, or an alloy of copper-chromium.

A photoresist plating mask 511 is formed (FIG. 7(b)). This mask may be, for example, two micrometers thick. A ferromagnetic material is electroplated through the mask (FIG. 7(c)). The deposited ferromagnetic material may be nickel, iron, cobalt, or an alloy of these and other materials. The ferromagnetic material is electroplated to a thickness many times that of photoresist plating mask 511, causing the ferromagnetic material to "mushroom" over the edges of the mask. The ferromagnetic layer 513, together with layer 407, forms magnetic plate 102.

Photoresist plating mask 511 is then removed along with the unplated areas of electroplating seed layer 509 (FIG. 7(d)), these having previously been covered by photoresist plating mask 511. Sacrificial layer 405 is sputter-etched away to release magnetic plate 102, freeing it to rotate (FIG. 7(e)). The etch used may be a concentrated two-minute hydrogen fluorine bath.

The present invention has been described in terms of preferred embodiments. The invention, however, is not limited to the embodiments depicted and described. Rather, the scope of the invention is defined by the appended claims.

What is claimed is:

1. A microactuated structure, comprising:
   a base;
   a cantilevered element affixed at one end to said base by at least one mechanical attachment to permit said element to change its orientation, the cantilevered element including a magnetically-active material; and
   a voltage source to apply an electrostatic force to the cantilevered element;

such that the voltage source produces an electrostatic force to prevent the cantilevered element from changing its orientation in the presence of an applied magnetic field.

2. The microactuated structure of claim 1 in which the mechanical attachment is at least one torsional support rotatably affixing the cantilevered element to the base.

3. The microactuated structure of claim 1 in which the mechanical attachment is a flexible material such as polyimide.

4. The microactuated structure of claim 1 in which the mechanical attachment is a hinged linkage or a folding mounting.

5. The microactuated structure of claim 1 in which the cantilevered element is highly reflective to direct optical beams for displays or communications.

6. The microactuated structure of claim 1 in which the cantilevered element is strongly dispersive in an acoustic beam such that the cantilevered element is easily detectable in an acoustic field.

7. The microactuated structure of claim 1 in which the cantilevered element serves as a platform for an energy source device.

8. The microactuated structure of claim 1, wherein the electrostatic force is a Coulombic attractive force.

9. The microactuated structure of claim 1, wherein said voltage source is formed integral with the base.

10. The microactuated structure of claim 1, further including:
   a first electrical contact made to the cantilevered element; and
   a second electrical contact made to the base, the voltage source being electrically connected between the first and second electrical contacts.

11. The microactuated structure of claim 1 wherein the cantilevered element is formed of a layer of the magnetically-active material.

12. The microactuated structure of claim 1 wherein one or more regions of the cantilevered element include a layer of the magnetically-active material plated onto a non-magnetic material.

13. The microactuated structure of claim 7, wherein the energy source is one of an ultrasound emitter and an electromagnetic radiation emitter.

14. An array of microactuated structures, each, comprising:
   a base;
   a cantilevered element affixed at one end to said base by at least one mechanical attachment to permit said cantilevered element to change its orientation, said cantilevered element including a magnetically-active material;
   a switchable voltage source to apply an electrostatic force to the cantilevered element of each microactuated structure to prevent a change in its orientation; and
   such that the cantilevered element of each of the microactuated structures may be individually selected not to change its orientation in the presence of a magnetic field if the electrostatic force is applied thereto.

15. The array of microactuated structures of claim 14, wherein the electrostatic force supplied by each of said voltage sources is a Coulombic attractive force.

16. The array of microactuated structures of claim 14, wherein the array of microactuated structures form one of an optical switch and an optical display.

17. A microstructure comprising:
   a base;
   a cantilevered element affixed at one end to said base by at least one mechanical attachment to permit said cantilevered element to move, said cantilevered element including a magnetically-active material;
   a first electrical connection made to the cantilevered element;
   a second electrical connection made to the base;
   a voltage source electrically connected between the first and second electrical connections to apply an electrostatic force to the cantilevered element to hold the cantilevered element against movement even in the presence of an applied magnetic field; and
   such that the applied magnetic field can apply a torque to the cantilevered element to cause it to move when the electrostatic force is not applied thereto.

18. A microstructure, comprising:
   a base;
   a movable element affixed at one end to said base by at least one mechnical attachment to permit said movable element to change its orientation, said movable element including a magnetically-active material; and
   a voltage source to apply an electrostatic force to said movable element;
   such that in the presence of an applied magnetic field, the forces applied to the movable element by the applied magnetic field, the electrostatic force and a reactive force from the base supply a zero net force to said movable element.

19. A microstructure, comprising:
   a base;
   an element affixed at one end to said base by at least one mechanical attachment to permit said element to change its orientation;
   a magnetically-active material at one or more regions of the element;
   a voltage source to apply an electrostatic force to the element; and
   a conducting pattern on the base;
   such that a current passed through the conducting pattern produces a magnetic field that moves the element if the electrostatic force is not applied thereto.

20. An array of microstructures, each of the microstructures comprising:
   a base;
   an element coupled at one end to at least one torsional support, the torsional support being rotatably mounted to the base;
   a magnetically-active material at a region of the element;
   a conducting pattern on the base; and
   a switchable voltage source to apply an electrostatic force to the element;
   such that a current passed through the conducting pattern produces a magnetic field to move the element such that only the elements that have current passed through a corresponding conducting pattern are moved if the electrostatic force is not applied thereto.

21. A microstructure, comprising:
   a base;
   an element affixed at one end to said base by at least one mechanical attachment to permit said element to change its orientation;

at least one layer of magnetically-active material placed on one or more regions of a surface of the element;

a first electrical connection made to the element;

a second electrical connection made to the base; and a voltage source electrically connected between the first and second electrical connections;

such that the voltage source causes a Coulombic attractive force to hold the element against movement in the presence of an applied magnetic field.

22. The microactuated structure of claim 1 wherein the cantilevered element, the mechanical attachment, and the magnetically-active material are microfabricated in one batch process.

23. The microactuated structure of claim 1 in which the source of the magnetic field is situated on the base.

24. The array of microactuated structures of claim 14 in which each cantilevered element is highly reflective to direct an optical beam.

25. A microactuated structure, comprising:

a base;

an element affixed to the base by a mechanical attachment that permits said element to move;

a magnetically active material at a region of the element;

an electrical connection made to the base;

an electrical connection made to the element;

a voltage source electrically connected between the electrical connection to the base and the element to apply an electrostatic force to the element such that if the electrostatic force is not applied to the element, a magnetic field causes the element to move with respect to the base, while if the electrostatic force is applied to the element, the element is held against movement in the presence of the magnetic field.

26. The microactuated structure of claim 25 wherein said voltage source is formed integral with the base.

27. The microactuated structure of claim 25 wherein the magnetic field is generated by a source formed integral with the base.

28. The microactuated structure of claim 25 wherein a region of the element includes a layer of a highly reflective material to direct optical beams.

29. The microactuated structure of claim 25 wherein a region of the element includes at least one of an ultrasound emitter, an electromagnetic radiation emitter and an energy sensor.

30. The microactuated structure of claim 25 in which the element is affixed to the base by a torsional support, a hinged linkage or a folding mounting.

31. The array of claim 14 wherein the voltage source is formed integral with the base.

* * * * *